United States Patent [19]
Watts

[11] Patent Number: 4,877,224
[45] Date of Patent: Oct. 31, 1989

[54] CORRUGATED ENERGY ABSORBER

[76] Inventor: James L. Watts, 2101 Wincrest, Galveston, Tex. 77551

[21] Appl. No.: 238,419

[22] Filed: Aug. 31, 1988

[51] Int. Cl.$^4$ .................. F16M 7/00; F16F 1/18; B63B 59/02; F16L 11/00
[52] U.S. Cl. ............................. 267/140; 114/219; 138/121; 267/160
[58] Field of Search ............... 267/139, 140, 153, 158, 267/160, 164, 47, 148; 114/219; 405/212, 215, 216; 264/150; 138/121, 122; 428/182–184

[56] References Cited

U.S. PATENT DOCUMENTS

| | | | |
|---|---|---|---|
| 1,546,584 | 7/1925 | Hutt | 267/47 |
| 2,843,074 | 7/1958 | Norman | 114/219 |
| 3,179,397 | 4/1965 | Cleereman et al. | 267/140 |
| 3,181,849 | 5/1965 | Mitchell | 267/140 |
| 3,794,311 | 2/1974 | Rode | 267/158 |
| 3,922,408 | 11/1975 | Smith | 267/140 |
| 3,928,701 | 12/1975 | Roehner | 114/219 X |
| 3,936,040 | 2/1976 | Wilson et al. | 267/140 |
| 3,997,150 | 12/1976 | Hanson et al. | 267/140 |
| 4,058,157 | 11/1977 | Wiegard | 267/160 X |

FOREIGN PATENT DOCUMENTS 0117928 7/1984 Japan .................................. 267/158

Primary Examiner—Robert J. Oberleitner
Attorney, Agent, or Firm—Neal J. Mosely

[57] ABSTRACT

An energy absorber or bumper for positioning on one object to absorb the impact of the later with another object is formed of an arcuate strip of rigid resiliently deflectable material having a plurality of corrugations extending circumferentially coaxial with the radius of curvature. When positioned on an object, the center of the arcuate strip is bowed radially outwardly from the surface of the object. The strip of material has sufficient resiliency to allow deflection of the arcuate surface of the material inwardly relative to the radius of curvature upon impact to the bowed surface and thereafter returns to its original configuration. In an elongate configuration, the height of the ridges above the furrows allows independent deflection of the ridges relative to one another along the longitudinal axis of the strip upon impact to the ridges and thereafter return to their original configuration.

30 Claims, 3 Drawing Sheets

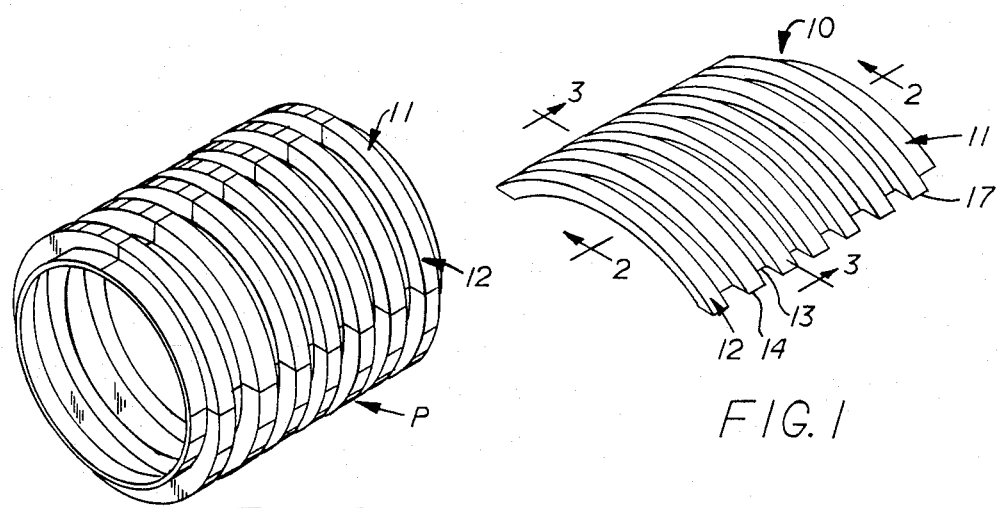
FIG.1
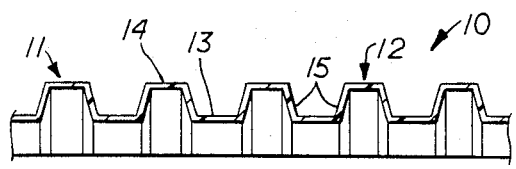
FIG.2
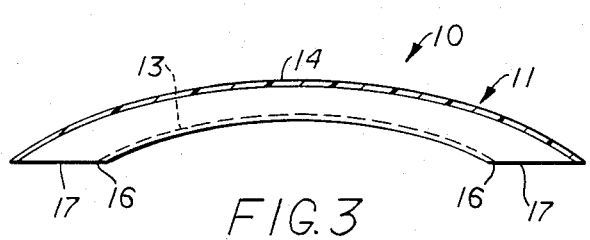
FIG.3
FIG.4
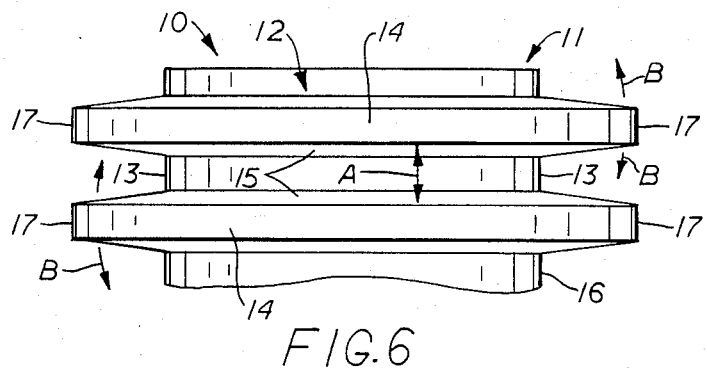
FIG.6
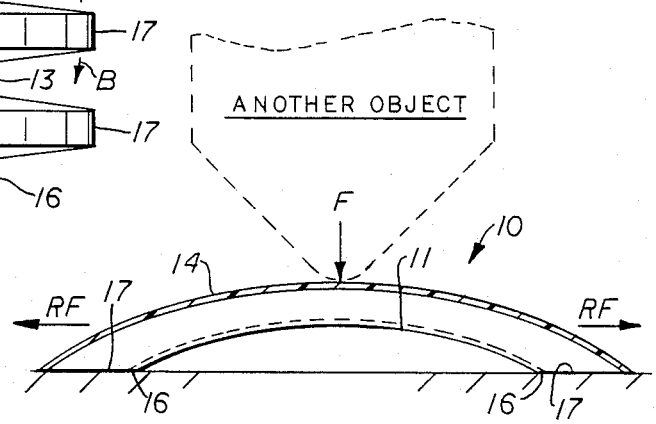
FIG.5
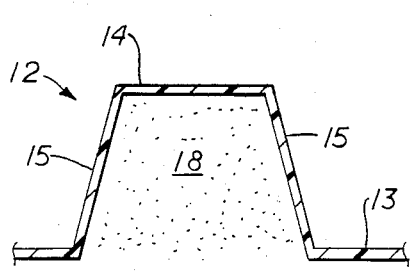
FIG.7

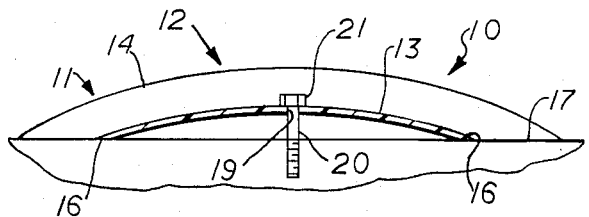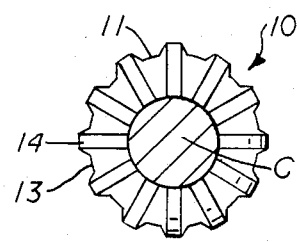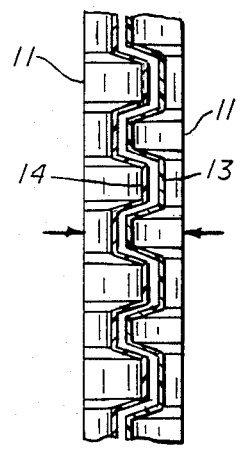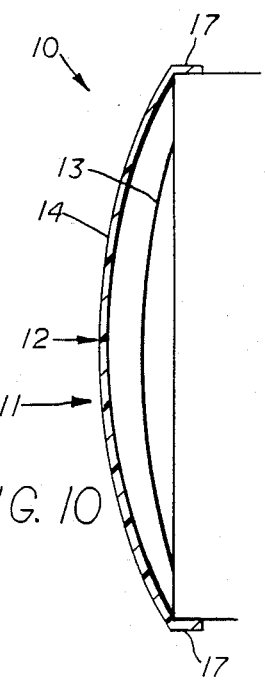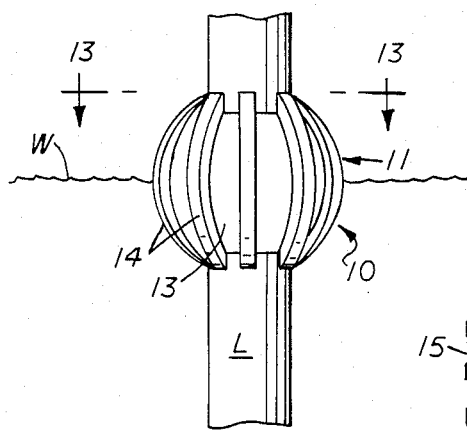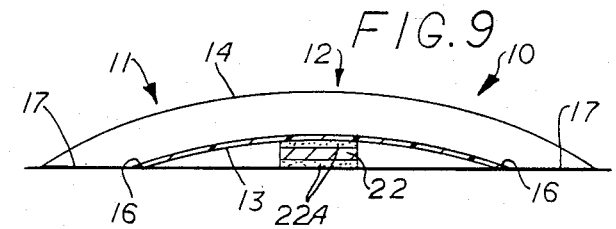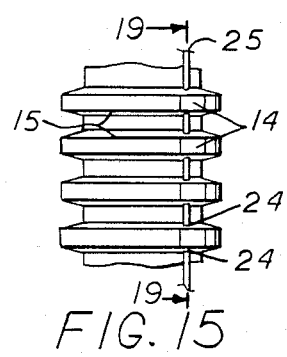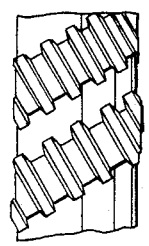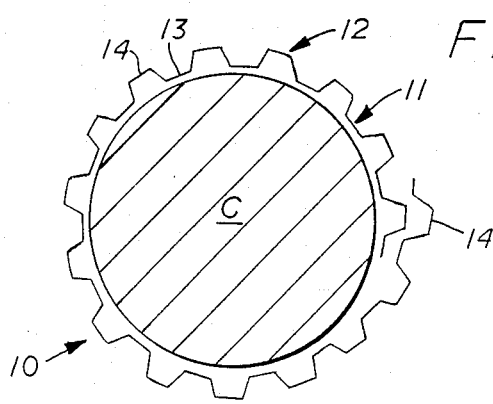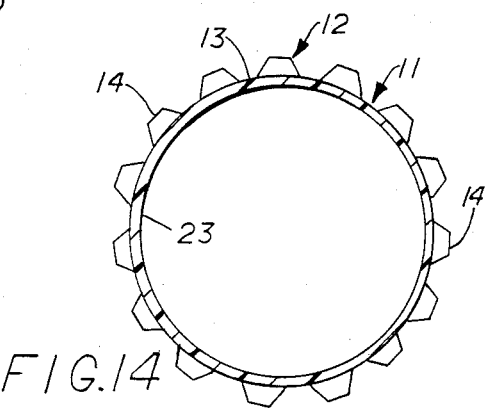

ROPE OR STRAP, ETC.

CORRUGATED ENERGY ABSORBER

BACKGROUND OF THE INVENTION

1. Field of the Invention

This invention relates generally to energy absorption devices or bumpers, and more particularly to an energy absorber or bumper formed of an arcuate strip of rigid resiliently deflectable material having one or more circumferential corrugations formed therein coaxial with the radius of curvature.

2. Brief Description of the Prior Art

There are several patents which disclose energy absorption apparatus of various construction.

Cleaves, U.S. Pat. No. 4,307,876 discloses an energy absorption apparatus for truck docks comprising a plurality of spring steel leaves disposed in independent relation from a point above the level of the dock to a point below the dock level so as to accommodate truck trailers of varying heights.

Way et al, U.S. Pat. No. 3,848,853 discloses an impact absorbing device comprised of used automobile tires stacked together to form a hollow cylinder. When placed upon a roadway, the device acts as a safety device, warning, or barricade to protect an automobile or its occupants from injury.

Walker, U.S. Pat. No. 3,664,653 discloses another energy absorber utilizing used automobile tires. The tires are secured together and filled with a liquid and are provide with a blow out plug to allow the liquid to escape when impacted.

Oberschulte, U.S. Pat. No. 1,722,674 discloses a dolphin pile for absorbing the kinetic energy of vessels moored thereto comprising a tubular enclosing structure formed of a plurality of similarly arched vertical sheet metal members rammed together and interlocked with the interlocking joints disposed along the neutral axis. The individual pile members are of box-like section with adjacent members arranged in reverse order and arranged to form a cylindrical structure with the convex surface of the members facing outward. The structure may be filled with a material such as sand, concrete, to increase the strength.

The present invention is distinguished over the prior art in general, and these patents in particular by an energy absorber or bumper for positioning on one object to absorb the impact of the later with another object which comprises an arcuate strip of rigid resiliently deflectable material having a plurality of corrugations extending circumferentially coaxial with the radius of curvature. When positioned on an object, the center of the arcuate strip is bowed radially outwardly from the surface of the object. The strip of material has sufficient resiliency to allow deflection of the arcuate surface of the material inwardly relative to the radius of curvature upon impact to the bowed surface and thereafter returns to its original configuration., In an elongate configuration, the height of the ridges above the furrows allows independent deflection of the ridges relative to one another along the longitudinal axis of the strip upon impact to the ridges and thereafter return to their original configuration.

SUMMARY OF THE INVENTION

It is therefore an object of the present invention to provide an energy absorber or bumper which is quickly and easily installed on an object to absorb the impact of the later with another object.

It is another object of this invention to provide an energy absorber or bumper in the form of an arcuate strip of rigid resiliently deflectable material having one or more circumferential corrugations which forms an outwardly bowed configuration when positioned on an object and has no sharp corners or other irregularities which would snag or cause abrasion.

Another object of this invention is to provide an energy absorber or bumper in the form of a circumferentially corrugated arcuate strip having sufficient resiliency to allow deflection of the arcuate surface of the material inwardly relative to the radius of curvature upon impact to the bowed surface and thereafter return to its original configuration.

Another object of this invention is to provide an energy absorber or bumper in the form of a strip comprising a section of a cylinder, circumferentially corrugated, or resilient deflectable material wherein the corrugations are a plurality of furrows and ridges of sufficient depth to allow independent deflection of the ridges relative to one another along the longitudinal axis of the strip upon impact to the ridges and thereafter return to their original configuration.

Another object of this invention is to provide an arcuate, circumferentially corrugated energy absorber or bumper which may be installed on objects by means of headed fasteners such that the head of the fastener is disposed beneath the raised portions of the corrugations to prevent damage to an object contacting the bumper.

Another object of this invention is to provide an arcuate corrugated energy absorber or bumper which may be easily and quickly installed on objects by means of conventional mechanical or adhesive fasteners.

Another object of this invention is to provide an arcuate corrugated energy absorber or bumper which may be easily cut to desired lengths with conventional cutting tools.

Another object of this invention is to provide an arcuate corrugated energy absorber or bumper wherein the raised portions of the corrugations may be filled with suitable materials to modify its strength, rigidity, and buoyancy characteristics.

Another object of this invention is to provide an arcuate corrugated energy absorber or bumper having sufficient flexibility to be installed on a wide range of object shapes.

Another object of this invention is to provide an elongate rectangular arcuate corrugated energy absorber or bumper which may be shaped to completely encircle an object.

Another object of this invention is to provide an elongate rectangular arcuate corrugated energy absorber or bumper which will slidably and rotatably encircle an object and rotate around the protected object when struck by another to prevent damage to both objects and will last longer than fixed bumpers due to the constantly changing point of impact.

Another object of this invention is to provide an elongate rectangular arcuate corrugated energy absorber or bumper which will slidably and rotatably encircle an object and will float in a predetermined semi-submerged position relative to the water surface.

Another object of this invention is to provide an arcuate corrugated energy absorber or bumper which will allow attachment of anchoring or fastening devices to the corrugated surface for securing other objects to the bumper.

A further object of this invention is to provide a method of manufacturing an arcuate corrugated energy absorber or bumper utilizing extruded thermoplastic corrugated pipe configurations.

A still further object of this invention is to provide an arcuate corrugated energy absorber or bumper which is simple in design and construction, economical to manufacture, and is rugged and durable in use.

Other objects of the invention will become apparent from time to time throughout the specification and claims as hereinafter related.

The above noted objects and other objects of the invention are accomplished by an energy absorber or bumper for positioning on one object to absorb the impact of the later with another object comprises an arcuate strip of rigid resiliently deflectable material having a plurality of corrugations extending circumferentially coaxial with the radius of curvature. When positioned on an object, the center of the arcuate strip is bowed radially outwardly from the surface of the object. The strip of material has sufficient resiliency to allow deflection of the arcuate surface of the material inwardly relative to the radius of curvature upon impact to the bowed surface and thereafter returns to its original configuration. In an elongate configuration, the height of the ridges above the furrows allows independent deflection of the ridges relative to one another along the longitudinal axis of the strip upon impact to the ridges and thereafter return to their original configuration.

BRIEF DESCRIPTION OF THE DRAWINGS

FIG. 1 is an isometric view of an arcuate corrugated energy absorber or bumper in accordance with the present invention.

FIG. 2 is a longitudinal cross section of the energy absorber or bumper of FIG. 1 taken along the section line 2—2.

FIG. 3 is a transverse cross section of the energy absorber or bumper of FIG. 1 taken along section line 3—3. FIG. 4 is an isometric view of an arcuate corrugated pipe or tube illustrating one method of manufacturing an energy absorber or bumper in accordance with the present invention.

FIG. 5 is a transverse cross section of the energy absorber or bumper illustrating the forces acting thereon when impacted by another object.

FIG. 6 is an elevation of the energy absorber or bumper illustrating the deflection of the corrugations relative to the longitudinal axis.

FIG. 7 is a cross section of the ridge of a corrugation showing it filled with another material.

FIG. 8 is a transverse cross section of the energy absorber or bumper bolted to an object.

FIG. 9 is a transverse cross section of the energy absorber or bumper attached to an object by adhesive means.

FIG. 10 is a transverse cross section of the energy absorber or bumper attached to a corner of an object.

FIGS. 11, 12, and 13 are illustrations showing the energy absorber or bumper fashioned to encircle an object.

FIG. 14 is a transverse cross section of the energy absorber or bumper encircling a central sleeve.

FIG. 15 is an elevation of the energy absorber or bumper having a fastener device installed thereon for securing other objects to the energy absorber or bumper.

FIG. 16 is an elevation showing the energy absorber or bumper spirally wrapped around an object.

FIG. 17 is a longitudinal cross section of two opposite facing energy absorber strips being positioned with the ridges of one strip received in the furrows of the opposed strip.

DESCRIPTION OF THE PREFERRED EMBODIMENT

Figure 18:
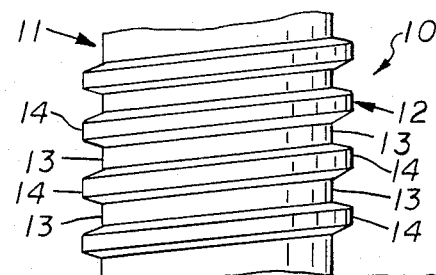
FIG. 18 is an elevation view showing an energy absorber strip with corrugations extending angularly transverse relative to the longitudinal axis of the strip.

Referring to the drawings by numerals of reference, there is shown in FIG. 1, a preferred energy absorber or bumper 10 for positioning on one object to absorb the impact of the later with another object. The energy absorber or bumper 10 is formed of an arcuate strip 11 of rigid resiliently deflectable material, such as a thermoplastic. Strip 11 is a section of a cylinder having one or more circumferential corrugations 12 formed therein coaxial or concentric with the cylinder. When placed on an object, the center of the arcuate strip 11 is bowed radially outwardly from the surface of the object. The plastic energy absorber or bumper 10 provides a curved raised surface having no sharp corners or other irregularities which would snag or cause abrasion. The arcuate strip 11 is sufficiently resilient to allow deflection of the arcuate surface inwardly relative to the radius of curvature upon impact to the bowed surface and thereafter returns to its original configuration.

As shown in longitudinal cross section in FIG. 2, and transverse cross section in FIG. 3, a preferred configuration for corrugations 12 is a plurality of generally parallel spaced arcuate furrows 13 and ridges 14 with slightly angularly diverging common side walls 15. Each furrow 13 and ridge 15 has a generally square U-shaped transverse cross section. The ridges 14 terminate a distance beyond the laterally opposed longitudinal sides 16 of the strip to form laterally opposed tips 17.

The strip 11 may be a short section having only a single corrugation, or the strip may be an elongate generally rectangular configuration with the alternate arcuate furrows 13 and ridges 14 extending transverse to its longitudinal axis. As seen in FIG. 18 the arcuate furrows and ridges may also extend angularly across the strip relative to the longitudinal axis of the strip in a segmented spiral fashion.

One method of manufacturing the arcuate strip is illustrated in FIG. 4. Hot thermoplastic material is extruded through a mold to form an elongate cylindrical pipe P having circumferential corrugations 12. The corrugations 12 may also be formed by corrugating an extruded or seamed tubing using conventional corrugating machinery of the type used for corrugating flexible ducting and corrugated heat exchange tubing. Apparatus of this type is also used to form tubing with helical corrugations.

After the pipe P has been corrugated and the corrugations set, the side wall of the pipe is cut longitudinally to produce a plurality of elongate transversely arcuate strips 11 with each strip having circumferential corrugations 12 formed therein coaxial with the radius of curvature, as previously described. Extended laterally opposed tips 17 may be formed by cutting the pipe transversely perpendicular to the longitudinal pipe axis. The elongate strips 11 may then be cut into the desired lengths and made available to the consumer. The consumer may easily cut the strips 11 to fit his particular application with a scissors, knife, saw, etc. The energy absorber or bumper strips 10 may also be formed individually in predetermined lengths by conventional thermoplastic molding techniques, such as injection molding, vacuum forming, etc.

The energy absorber or bumper 10 is preferably formed a suitable thermoplastic, such as high density polyethylene, and if manufactured according to the extruded pipe method, the pipe diameters may range from ¾ of an inch to 48-inches to provide a variety of curve sizes and resultant resiliency and load bearing characteristics. The high density polyethylene material is suitable because of its strength, light weight, flexibility, and resistance to abrasion. The polyethylene material is also very resistant to acids, alkalis, salt solutions, and many other corrosive agents. An ultraviolet stabilizer, such as finely divided carbon black, may be added to the polyethylene resin to resist deterioration by sunlight. Thus, the energy absorber or bumper made from such a material lends itself to a wide range of applications and uses.

FIGS. 5 and 6 illustrate the reaction of the energy absorber or bumper 10 when the object on which it is positioned is hit by another object. The corrugations 12 are of such depth that the arcuate strip 11 is stiff enough to hold its arcuate shape but flexible enough to deflect slightly. As indicated by arrows in FIG. 5, when a force F is applied to the top of the strip or ridges 14, the arcuate surface of the strip will deflect inwardly relative to the radius of curvature upon impact and thereafter return to its original configuration. The resultant force RF tends to spread the longitudinal sides of the strip outward.

An elongate strip having a plurality of corrugations is also flexible longitudinally (in the fashion of an accordion), as indicated by arrows A and B in FIG. 6. The height of the ridges 14 above the furrows 13 is sufficient to allow independent deflection of the ridges 14 relative to one another along the longitudinal axis of the strip upon impact to the ridges and thereafter they return to their original configuration (arrow A). As indicated by arrow B the tips 17 may flex relative to one another.

Thus the individual ridges 14 will absorb a shock or impact directly, or at an angle while retaining the basic shape. The web or furrows 13 between the ridges 14 is also a curved surface allowing for further absorption of the forces caused by impact with another object.

As shown in FIG. 7, the ridges 14 may be filled with a suitable fill agent 18, such as expanded polystyrene, or other suitable material to increase the rigidity of the energy absorber or bumper. The polyethylene is somewhat buoyant by itself, but the ridges may also be filled with lightweight foamed materials or heavy materials for altering the buoyancy characteristics of the energy absorber or bumper strip.

INSTALLATION

The present energy absorber or bumper is suitable for use on a wide range of objects, such as on a boat dock, pier, vessel, the interior of moving vans, structural columns, service doors in hospitals and restaurants, storefronts, and glass doors just to name a few.

As shown in FIG. 8, one or more holes 19 may be drilled or pre-formed through selected furrows 13 intermediate the longitudinal sides 16 of the strip 11 for receiving a bolt 20 for securing the strip to an object through the center of the outwardly bowed surface whereby the longitudinal side edges of the strip will expand laterally outward upon impact to the ridges and thereafter return to their original configuration as described with reference to FIG. 5. The enlarged head 21 of the bolt 20 engages the surface of the furrow 14 and the ridges 14 adjacent the bolt head extend above the head to prevent contact between the head of the bolt and the striking object upon impact to the ridges.

The energy absorber or bumper strip 11 may also be mounted on an object by securing it to the object with adhesive material or double edged tape. For example, as shown in FIG. 9, one or more adapter strips 22 having adhesive 22A on opposite sides is secured to the underside of the furrows 13 at the approximate center of the arc and the energy absorber or bumper is simply pressed onto the object. The adapter strip thickness compensates for the height of the arc. The energy absorber or bumper strip 11 may also be mounted on an object by securing the tips 17 extending beyond the longitudinal side edges 16 to the object by adhesive material or double edged tape (not shown).

Because the ridges 14 terminate a distance beyond the laterally opposed longitudinal sides 16 of the strip, the tips 17 may be bent approximately 90' for securing the longitudinal side edge of the strip to a corner surface such as a dock or pier (FIG. 10).

The hollow curved configuration of the strip 11 permits moisture to escape, and in some applications the corrugations 12 may also be drilled or otherwise provided with apertures to allow moisture between the strip and the object on which it is positioned to escape.

FIGS. 11, 12, and 13 show another feature of the present energy absorber or bumper 10 wherein the ends of an elongate rectangular strip 11 are connected together to form a circular configuration to encircle the object on which it is positioned. The ridges 14 at the ends of the elongate rectangular strip 11 may be overlapped and secured together by bolting, gluing, or other conventional means. In this manner, its may be affixed to the periphery or circumference of many square, cylindrical, or other shaped objects to form a spherical protective bumper. For example, it may be installed on various containers, such as oil drums, explosive chemical drums, hazardous waste drums and the like.

The circular configuration may be sized to loosely encircle the object on which it is positioned whereby the energy absorber or bumper 10 is slidably and rotatably positioned on an object. Such a device would be suitable for use as a bumper around columns in a warehouse, for example, to prevent damage to the column, and to a forklift truck or workers who may accidentally contact the column. By loosely encircling an object, another object striking the bumper will tend to rotate it around the protected object, thus preventing damage to both objects because the force is deflected. This feature will enable the bumper to last much longer than a fixed bumper because the point of impact is constantly changing.

The circular configuration is also ideal for on the legs L of a boat dock or pier and because of the buoyant properties of the thermoplastic material the energy absorber or bumper will be slidably and rotatably positioned on the leg and will float in a predetermined semi-submerged position relative to the water surface W. The polyethylene is somewhat buoyant by itself, but the ridges 14 may also be filled with lightweight foamed materials or heavy materials for altering the buoyancy characteristics of the energy absorber or bumper strip as previously described. The loose fitting energy absorber or bumper or bumper will float at the waterline and will rise and fall with the water level, whereas a fixed bumper may be above or below the water level depending upon the water conditions.

As shown in FIG. 14, the elongate rectangular strip may be connected together to form a circular configuration encircling a hollow cylindrical sleeve member 23 and the longitudinal side edges 16 and tips 17 of the strip sealed to the central sleeve to form air chambers within the arched surface and ridges 14. This embodiment also may be slidably and rotatably positioned on an object in a body of water and will float in a predetermined semi-submerged position relative to the water surface.

Figure 19:
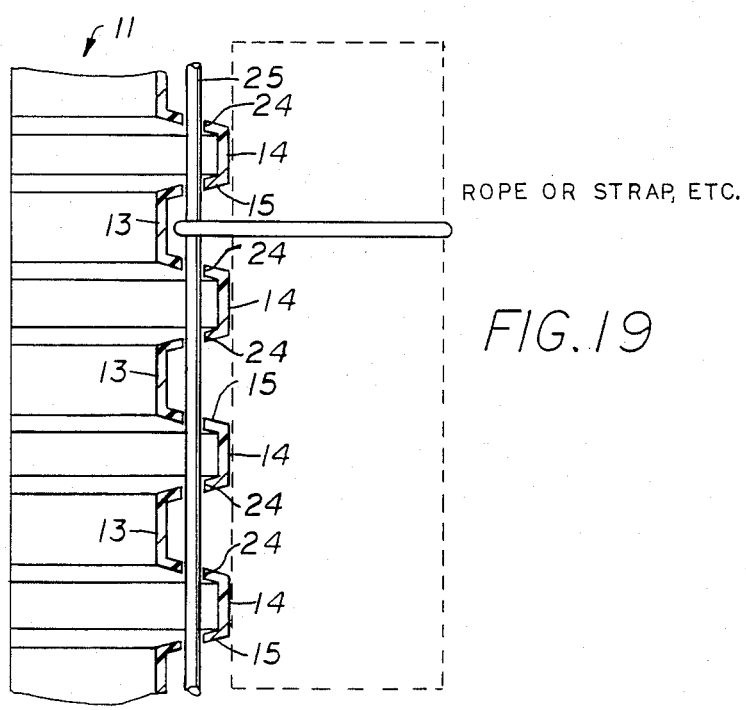
FIG. 19 is a longitudinal cross section of the energy strip of FIG. 15 showing a rod passing through apertures in the ridges and how other objects may be secured to the strips by ropes or straps.

The corrugations of the energy absorber or bumper strip may be apertured to receive auxiliary anchoring or fastening devices such as rings or clips and the like for securing other objects to the energy absorber or bumper. For example, as shown in FIGS. 15 and 19, the side walls 15 of the ridges 14 can be provided with a plurality of longitudinally aligned holes 24 and a rod 25 inserted through the holes to provide exposed sections between adjacent ridges to receive ropes or straps for securing other objects to the energy absorber or bumper. The rod 25 provides a convenient "tie-down" member allowing the objects being moved to be strapped to the energy absorber or bumper. If the energy absorber or bumper is installed on a pier or boat dock, the boat could tied to the energy absorber or bumper.

Figure 17A:
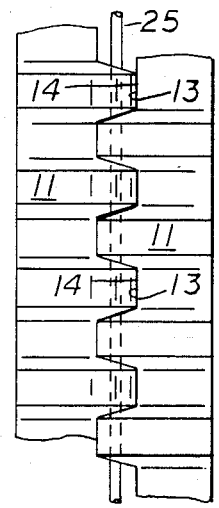
FIG. 17A is an elevation of two opposite facing energy absorber strips being positioned with the ridges of one strip received in the furrows of the opposed strip and fastened together with a rod.

The elongate rectangular strip 11 may also be spirally wrapped around the object on which it is positioned to protect an elongate portion of the object from impact by another object (FIG. 16). As shown in FIGS. 17 and 17A, the corrugations may be spaced and configured such that two identical energy absorber strips 11 may be positioned in an opposite facing relation, and brought together in an offset relation whereby the ridges 14 of one strip are received in the furrows 13 of the opposed strip. The mating strips 11 may be secured together in this position by passing a fastening device, such as a rod 25 through holes 24 provided in the side walls 15 of the ridges.

While this invention has been described fully and completely with special emphasis upon a preferred embodiment, it should be understood that within the scope of the appended claims the invention may be practiced otherwise than as specifically described herein.

I claim:

1. An energy absorber for positioning on one object to absorb the impact of the later with another object comprising;

an arcuate strip of rigid resiliently deflectable material having a plurality of circumferential alternating arcuate ridge and furrow corrugations formed therein generally parallel and coaxial with the radius of curvature of said strip and the ridges of said corrugations terminating a distance beyond two opposed side edges of said strip to define laterally opposed tips, the center of the arcuate strip bowed radially outwardly from the surface of the object on which it is to be positioned, and said strip of material having sufficient resiliency to allow deflection of the arcuate surface of the material inwardly relative to the radius of curvature upon impact to the bowed surface and thereafter returning to its original configuration, and the depth of said corrugations being sufficient to allow independent deflection of the corrugations relative to one another along the longitudinal axis of said strip upon impact and thereafter returning to their original configuration.

2. The energy absorber according to claim 1 in which said corrugations comprise alternating ridges and furrows which are helically curved.

3. The energy absorber according to claim 1 in which said corrugations are generally square U-shaped in transverse cross section.

4. The energy absorber according to claim 1 which said arcuate strip is a section of a cylinder with said corrugations extending transverse to its longitudinal axis and 5. The energy absorber according to claim 4 in which said corrugations extend angularly transverse relative to the longitudinal axis of said strip.

6. The energy absorber according to claim 4 in which said ridges terminate a distance beyond the laterally opposed longitudinal sides of said strip sufficient to be bent approximately 90' for securing the longitudinal side edge of said strip to a corner surface.

7. The energy absorber according to claim 4 in which said corrugations are filled internally with material for increasing the rigidity of same.

8. The energy absorber according to claim 4 including mounting means for securing the longitudinal side edges of said strip to the object on which it is positioned.

9. The energy absorber according to claim 8 in which said mounting means comprises an adhesive material between the longitudinal side edges of said strip and the object on which it is positioned.

10. The energy absorber according to claim 4 in which selected furrows intermediate the longitudinal sides of said strip have apertures for receiving fastening means for securing said strip to the object on which it is positioned.

11. The energy absorber according to claim 4 in which said ridges are filled with material for altering the buoyancy characteristics of said strip.

12. An energy absorbing system comprising an object requiring protection, an energy absorber positioned on said object to absorb impact, comprising an arcuate strip of rigid resiliently deflectable material having a plurality of circumferential alternating arcuate ridge and furrow corrugations formed therein generally parallel and coaxial with the radius of curvature of said strip and the ridges of said corrugations terminating a distance beyond two opposed side edges of said strip to define laterally opposed tips, the center of the arcuate strip bowed radially outwardly from the surface of said object, and said strip of material having sufficient resiliency to allow deflection of the arcuate surface of the material inwardly relative to the radius of curvature upon impact to the bowed surface and thereafter returning to its original configuration.

13. An energy absorbing system according to claim 12 in which said alternate arcuate furrows and ridges are generally square U-shaped in transverse cross section.

14. An energy absorbing system according to claim 12 in which said arcuate strip is an elongate generally rectangular configuration with said alternate arcuate furrows and ridges extending transverse to its longitudinal axis.

15. An energy absorbing system according to claim 14 in which the ends of said elongate rectangular strip are connected together by connecting means to form a circular configuration to encircle said object.

16. An energy absorbing system according to claim 15 in which the ends of said elongate rectangular strip are connected together to form a circular configuration to loosely encircle said object, whereby said energy absorber is slidably and rotatably positioned thereon.

17. An energy absorbing system according to claim 14 which the ends of said elongate rectangular strip are connected together to form a circular configuration to loosely encircle said object, whereby said energy absorber will float in a predetermined semi-submerged position relative to the water surface where said object is in a body of water.

18. An energy absorbing system according to claim 14 including a hollow cylindrical sleeve member, the ends of said elongate rectangular strip connected together to form a circular configuration encircling said sleeve, and the longitudinal side edges of said strip are sealed to said sleeve to form air chambers inside the ridges, whereby said sleeve may be slidably and rotatably positioned on said object and float in a predetermined semi-submerged position relative to the water surface where said object is in a body of water.

19. An energy absorbing system according to claim 12 in which said arcuate furrows and ridges extend angularly transverse relative to the longitudinal axis of said strip.

20. An energy absorbing system according to claim 12 including means cooperable with said tips to secure said strip to said object.

21. An energy absorbing system according to claim 20 in which said ridges terminate a predetermined distance beyond the laterally opposed longitudinal sides of said strip and are bent approximately 90' and secured to a corner surface of said object.

22. An energy absorbing system according to claim 13 in which said ridges are filled internally with material for increasing the rigidity of same.

23. An energy absorbing system according to claim 12 including mounting means securing the longitudinal side edges of said strip to said object.

24. An energy absorbing system according to claim 23 in which said mounting means comprises an adhesive material between the longitudinal side edges of said strip and the object on which it is positioned.

25. An energy absorbing system according to claim 12 in which said furrows have holes at the edges of said strip, a fastener having a threaded shank portion is received through said holes and an enlarged head engaging the surface of the furrow, and the ridges adjacent the engaged furrow extending above the fastener head to prevent contact between the head of the fastener and an object impacting the ridges.

26. An energy absorbing system according to claim 12 in which said ridges are filled with material for altering the buoyancy characteristics of said strip.

27. An energy absorbing system according to claim 12 in which said elongate rectangular strip is spirally wrapped around said object to protect an elongate portion of said object from impact by another object.

28. An energy absorbing system according to claim 12 in which said ridges are apertured and have auxiliary anchoring or fastening devices therein for securing other objects to said energy absorber.

29. An energy absorbing system according to claim 12 in which said ridges have a plurality of longitudinally aligned holes, and a rod is received through said holes to provide exposed sections between adjacent ridges to receive fastening means for securing other objects to said energy absorber.

30. An energy absorbing system according to claim 12 in which said energy absorber comprises a plurality of said strips overlapping in an offset relation with the ridges of one strip received in the furrows of the other strip.

* * * * *